UNITED STATES PATENT OFFICE.

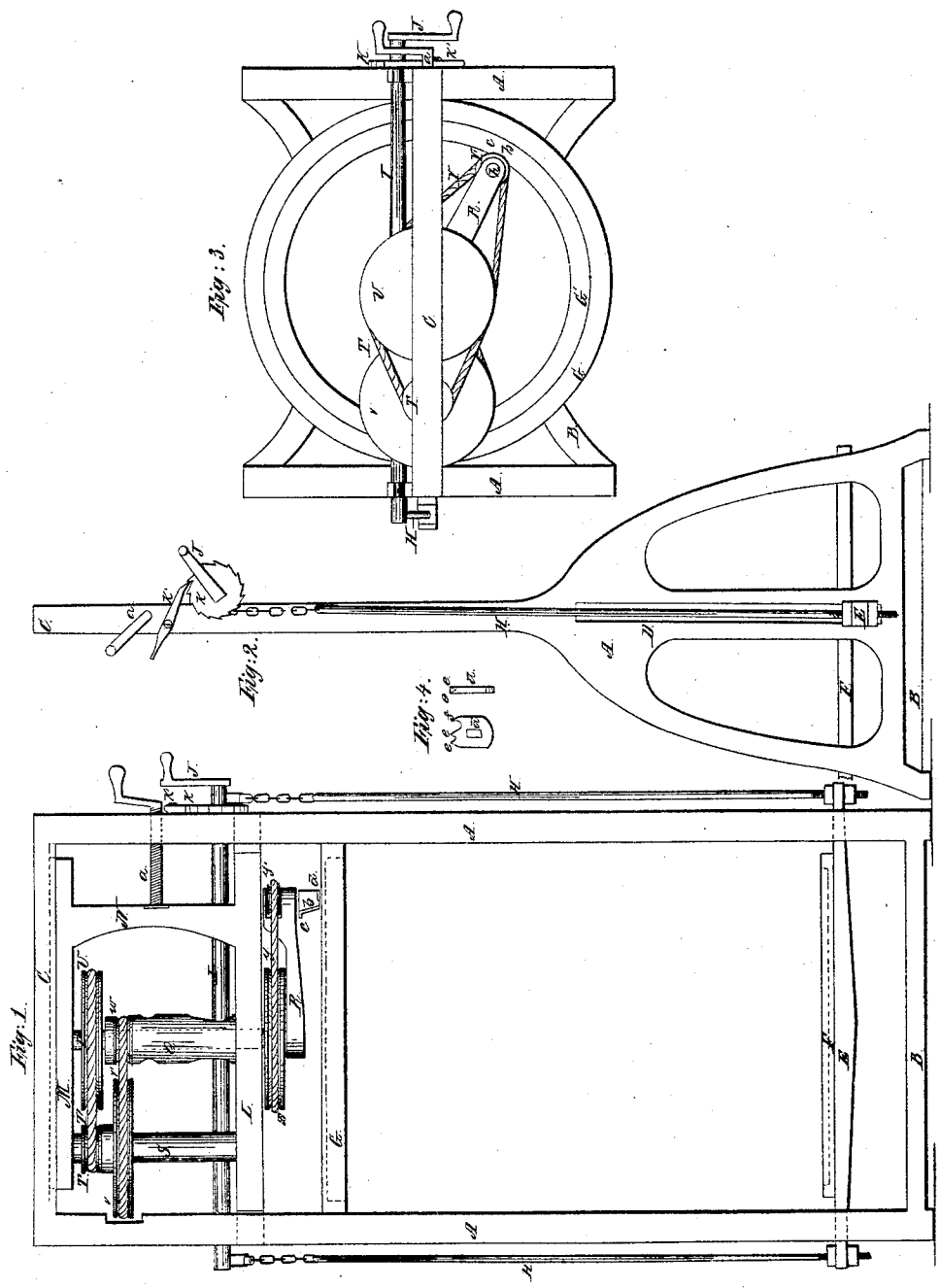
J. H. Mattison,
Coopers' Groze.
Nº 21,769.
Patented Oct. 12, 1858.

JAMES H. MATTISON, OF SCRIBA, NEW YORK.

MACHINE FOR CHAMFERING AND CROZING BARRELS.

Specification of Letters Patent No. 21,769, dated October 12, 1858.

*To all whom it may concern:*

Be it known that I, JAMES H. MATTISON, of Scriba, in the county of Oswego and State of New York, have invented a new and useful Machine for Chamfering and Crozing Barrels; and I do hereby declare that the same is described and represented in the following specification and drawings.

To enable others skilled in the art to make and use my invention I will proceed to describe its construction and operation referring to the drawings in which the same letters indicate like parts in each of the figures.

Figure 1, is an elevation of the front of the machine. Fig. 2, is an elevation of one side. Fig. 3, is a plan or top view.

The nature of my invention for chamfering and crozing barrels, consists in the use of a solid shaft, and a hollow shaft, one turning in the other and operated by pulleys or gears at different speeds, for the purpose of giving motion to the chamfering and crozing tools, and carrying them forward to perform their work, in chamfering and crozing barrels. And in making a crozing tool of a single piece of metal provided with two spurs one before the other, to cut the sides of the croze or score, and a hook or grooving tool to cut the bottom of the score or croze.

In the accompanying drawings A, A, are the two sides or posts made in the form represented in the drawing and connected at the bottom by the frame B, and at the top by the bar C, making a strong frame to which the other parts are fastened or connected. There are some slots D, in the sides A, for the bar E, to traverse in, upon which bar the platform F, is fastened, upon which the barrel to be crozed is placed, and the top of the barrel raised up into the rim G, to be crozed; this rim G, is fastened to the sides A, A, and has a flange projecting in from its upper edge, so as to hold the barrel without removing the truss hoop. There may be a rim G′, fitted and fastened to this to adapt the machine to barrels of a smaller size; and a series of such rims may be made with their interior diameters varying in size, so as to adapt the machine to barrels of various sizes; and there may be some rims made and applied to the platform, so as to hold the lower end of the barrel in the center of the platform.

The bar E, and platform F, are raised by the rods H, H, connected to the shaft I, by chains and staples as shown in the drawings. The shaft I, is turned by the crank J, and its journals turn in brackets fastened to the posts A, and it has the ratchet wheel K, fastened to it which is caught by the pawl K′, so as to hold the shaft and keep the platform and barrel up, while the latter is being crozed.

L, is a bar with tenons fitted to traverse in mortises in the posts A, A, and M, is a bar with a rib on it fitted to traverse in a groove in the under side of the bar C. These bars L, and M, are connected by the standard N, which is firmly fastened to each of them, so as to form a traversing carriage for carrying and traversing the chamfering and crozing apparatus.

P, is a solid shaft with its upper end turning in the bar M, while its lower portion turns in the hollow shaft Q, which turns upon the shaft P, and its journal turns in the bar L. The arm R, is made in the form shown in the drawing and fastened to the lower end of the shaft P, to carry the chamfering and crozing tools. S, is a shaft turning in the bars L, and M, parallel to the shafts P, and Q, and carrying the pulley T, and band T′, to turn the pulley U, and shaft P, with the arm R, and move it slow, and carry the chamfering and crozing tools to their work.

V, is a large pulley carrying the band V′, and turning pulley W, and hollow shaft Q, to which the large pulley X, is fastened carrying the band Y, and turning the pulley Y′, and shaft Z, very fast to operate the chamfering and crozing tools with a quick motion, to chamfer and croze the barrels; while they the tools are moved around and carried forward with comparatively a slow motion, to do their work. It will be apparent that gears may be substituted for a part, or for all the pulleys and bands described. The shaft S, may be provided with a loose and fast pulley for the band which is to operate the machine. The bars L, and M, with the parts attached are all moved and traversed by the screw *a*, to bring the shaft P, into the center of the rim G, when the barrel is put into the rim G, to be chamfered and crozed; and after it is done, and while the arm R, is under the screw it is turned to carry the crozing tools out of the croze and release the barrel so that another may be supplied to the machine.

The shaft Z, turns in the end of the arm

R, and has the cutter block *b*, fastened to its lower end, to which block the chamfering tool *c*, is fastened, also the crozing tool *d*, shown in Fig. 4. This tool is made in the form shown in the drawing, with two spurs *e, e*, one before the other to cut the sides of the score, without heating as they would do if the spurs were opposite to each other, so as to crowd the wood against each other, but being placed one before the other the spurs cut the sides of the score without crowding or pressing the wood cut against each other, and therefore less liable to heat in working, so as to draw the temper of the tool. A little behind the spurs on the same stock I make a hook or grooving chisel *f*, to cut the bottom of the croze and remove the wood cut off by the spurs *e, e*, and perfect the groove or croze. The arm R, may have a series of holes in it or a slot fitted to the end of the shaft P, so that its position may be changed upon the shaft to adapt it to barrels of different sizes.

I believe I have described and represented my invention so as to enable any person skilled in the art to make and use it. I will now state what I desire to secure by Letters Patent, to wit:

1. I claim a crozing tool provided with two spurs, one before the other to cut the sides of the croze or score, and a hook or grooving tool to cut the bottom of the score when the whole is made or formed of a single piece of metal substantially as described.

2. I claim the use of the solid shaft P, and hollow shaft Q, in combination with the pulleys T, U, V, and W, or their equivalents, which operate them with different velocities when used for the purpose of giving motion to the chamfering and crozing tools or their equivalents, and for moving or carrying them (the chamfering and crozing tools) forward, to perform their work in chamfering and crozing barrels, in the way and manner described.

JAS. H. MATTISON.

Witnesses:
 ROBERT SIMPSON,
 SOLOMON MATTISON.